(12) United States Patent
Vieux et al.

(10) Patent No.: US 7,136,756 B1
(45) Date of Patent: Nov. 14, 2006

(54) METHOD FOR DETERMINING RUNOFF

(75) Inventors: Baxter E. Vieux, Norman, OK (US); Matthew C. Lawrence, Raleigh, NC (US); Ryan M. Hoes, Norman, OK (US)

(73) Assignee: Vieux and Associates, Inc., Norman, OK (US)

( * ) Notice: Subject to any disclaimer, the term of this patent is extended or adjusted under 35 U.S.C. 154(b) by 68 days.

(21) Appl. No.: 10/979,902

(22) Filed: Nov. 2, 2004

(51) Int. Cl.
*G01W 1/00* (2006.01)

(52) U.S. Cl. .................... 702/5; 702/3; 703/9
(58) Field of Classification Search ............. 702/3–5; 703/12, 13, 9, 102
See application file for complete search history.

(56) References Cited

OTHER PUBLICATIONS

Vieux, B.E. et al., 2002, Vflo(TM): A Real-Time Distributed Hydrologic Model, Vieux & Associates, Inc., Proc. 2nd Federal Interagency Hydrologic Modeling Conference, Las Vegas, Nevada, Jul. 28-Aug. 1, 2002, pp. 1-12.*

\* cited by examiner

*Primary Examiner*—Donald McElheny, Jr.
(74) *Attorney, Agent, or Firm*—Tomlinson & O'Connell, PC

(57) ABSTRACT

A real-time hydrologic modeling system to determine the hydrologic properties a selected geographic region. In a preferred embodiment, a drainage network of individual cells is created for the geographic region. The outflow of a selected cell within the drainage network is determined by solving the runoff from cells upstream of the selected cells until the flow of all upstream cells is known. The flow value of a cell is based upon factors such as runon, infiltration, and precipitation. In another embodiment the outflow of a selected cell is determined by setting simulated flow rates to equal measured flow rates at observation points upstream of the selected cell and within the drainage network. The flow rates of cells upstream of the observation points are adjusted proportionally based on hydrologic quantities of runoff, precipitation and drainage area to determine the outflow of the selected cell.

31 Claims, 6 Drawing Sheets

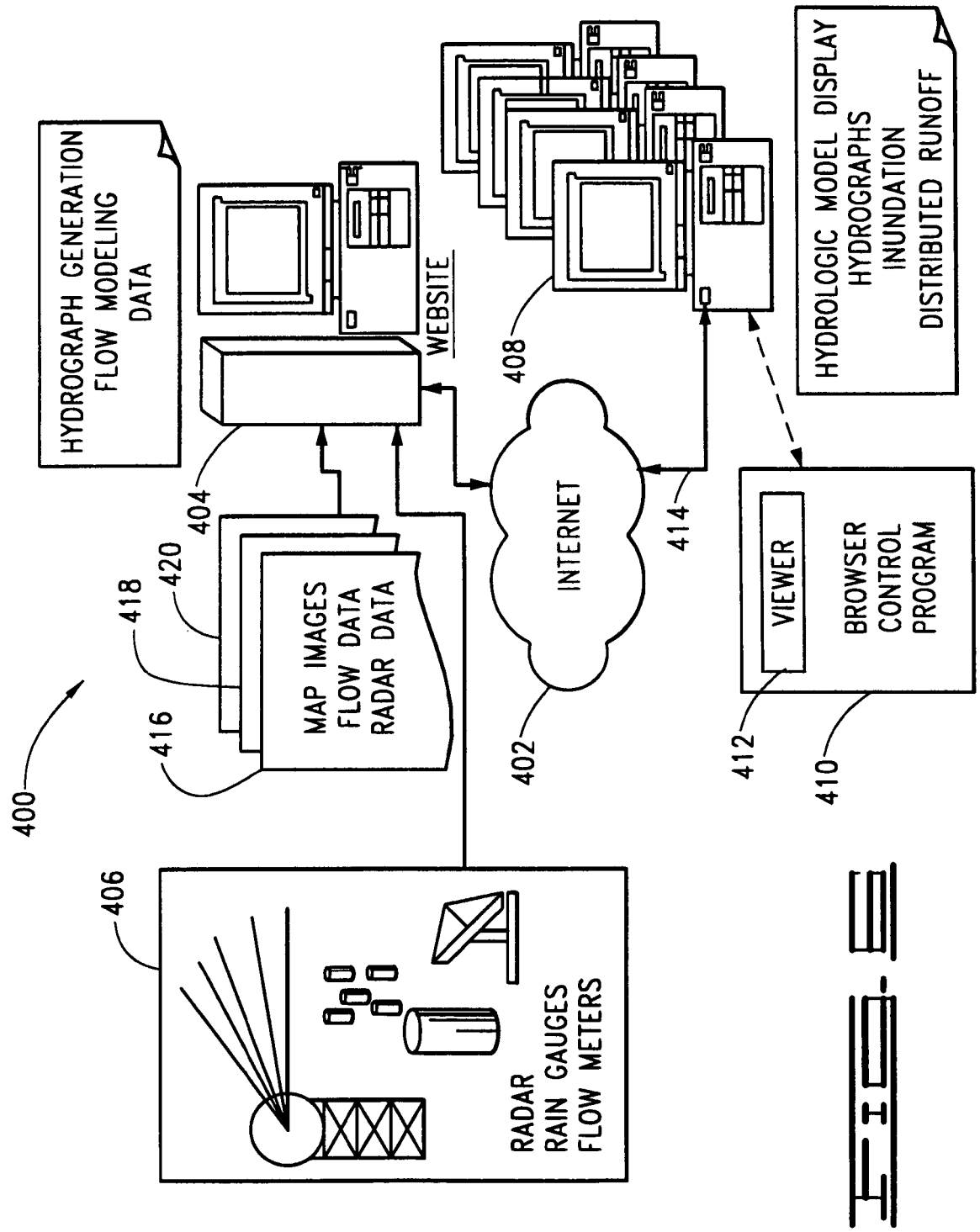

METHOD FOR DETERMINING RUNOFF

FIELD OF THE INVENTION

The present invention relates generally to determining surface water runoff, and more specifically, to deriving a physics-based distributed parameter watershed model.

SUMMARY OF THE INVENTION

The present invention is directed to a method for producing a real-time hydrologic model for a geographical region. The geographic region comprises a cell. The cell comprises a plurality of soil parameters and a plurality of surface parameters. The method comprises creating a topographical flow direction map for the cell of the geographical region. The plurality of soil parameters and the plurality of surface parameters for the cell on the topographical flow direction map are displayed. At least one of the plurality of soil parameters and/or at least one of the plurality of surface parameters affecting the hydrologic property of the cell are edited and the hydrologic property of the cell is simulated to produce the real-time hydrological model of the geographical region.

The present invention further includes a method for producing a real-time hydrologic property model for a geographical region. The geographic region is characterized by at least a cell. The cell comprises a plurality of soil parameters, a plurality of surface parameters, and has at least an inflowing adjacent cell. The inflowing adjacent cell comprises a plurality of soil parameters and a plurality of surface parameters. The method comprises obtaining a precipitation rate for the cell and a precipitation rate for the inflowing adjacent cell and determining a calculated hydrologic property value for the inflowing adjacent cell based on the plurality of soil parameters for the inflowing adjacent cell and plurality of surface parameters for the inflowing adjacent cell. The method further includes determining a calculated hydrologic property value for the cell based on the calculated hydrologic property value for the inflowing adjacent cell and obtaining a non-current hydrologic property value for the cell. The non-current hydrologic property value is then replaced with the calculated hydrologic property value for the cell and the hydrologic property value for the inflowing adjacent cells is apportioned with the non-current hydrologic property value. The hydrologic property for the cell and the hydrologic property for the inflowing adjacent cells are updated with an updated precipitation value for the cell and an updated precipitation value for the inflowing adjacent cells. The hydrologic property of the cell is then simulated based on the plurality of soil parameters, the plurality of surface parameters, and the updated precipitation value.

Finally, the present invention includes a method for determining runoff of a geographical region for flooding and water resources management. The geographic region has a plurality of soil parameters and a plurality of surface parameters and comprises at least a cell having a variable hydrologic property. The method comprises creating a topographical flow direction map of the geographic region and assigning a slope to the geographic region. A precipitation value for the geographic region is obtained and at least one of the plurality of soil parameters and/or at least one of the plurality of surface parameters of the geographic region are edited to affect the variable hydrologic property of the cell. The hydrologic property of the cell is then simulated based on the slope, the plurality of soil parameters, the plurality of surface parameters, and the precipitation value to determine the runoff of the geographical region in substantially real-time or in post-analysis.

BRIEF DESCRIPTION OF THE FIGURES

FIG. 2 illustrates the presence of rainfall, runon, infiltration and runoff.

FIG. 4 further illustrates adjusting upstream flow values based on one or more hydrologic quantities.

FIG. 6 illustrates an information distribution system in which a server collects and processes data to produce the hydrograph of FIG. 5. FIG. 6 further illustrates the use of a general-purpose computer to access the hydrograph via the Internet.

DETAILED DESCRIPTION OF THE PREFERRED EMBODIMENTS

Flood-warning systems provide valuable information that can predict water levels for areas under threat of flood. The knowledge of how much runoff or flow is occurring at a discharge point within a watershed can protect lives and property from flood damage. Determining how much runoff is or will occur at a particular location within the watershed requires the integration of hydrologic prediction models, precipitation estimates, and systems for information distribution. Previous methods for determining runoff provided only estimations based upon assumed uniform rainfall values over an entire watershed. Thus, there exists a need for improved methods of providing high-resolution runoff estimation for management of water from watersheds of varying size.

The present invention is directed to methods of providing high-resolution, physics-based distributed hydrologic modeling for managing water. Improved hydrologic modeling capitalizes on access to high-resolution quantitative precipitation estimates from model forecasts, radar, satellite, rain gauges, or combinations of multi-sensor products. The distributed models of the present invention are better adapted to represent the spatial variability of factors that control runoff, and therefore, are more accurate. The present invention employs a finite element solution to the kinematic wave equations. This method is capable of providing more efficient modeling and allows large drainage systems to be solved quickly on a desktop computer. Further the methods of the present invention are capable of reducing simulation from days to minutes or seconds for large river basins. Thus, parties interested in the potential flooding effects of a precipitation event are able to more efficiently and accurately predict floods.

Figure 1:
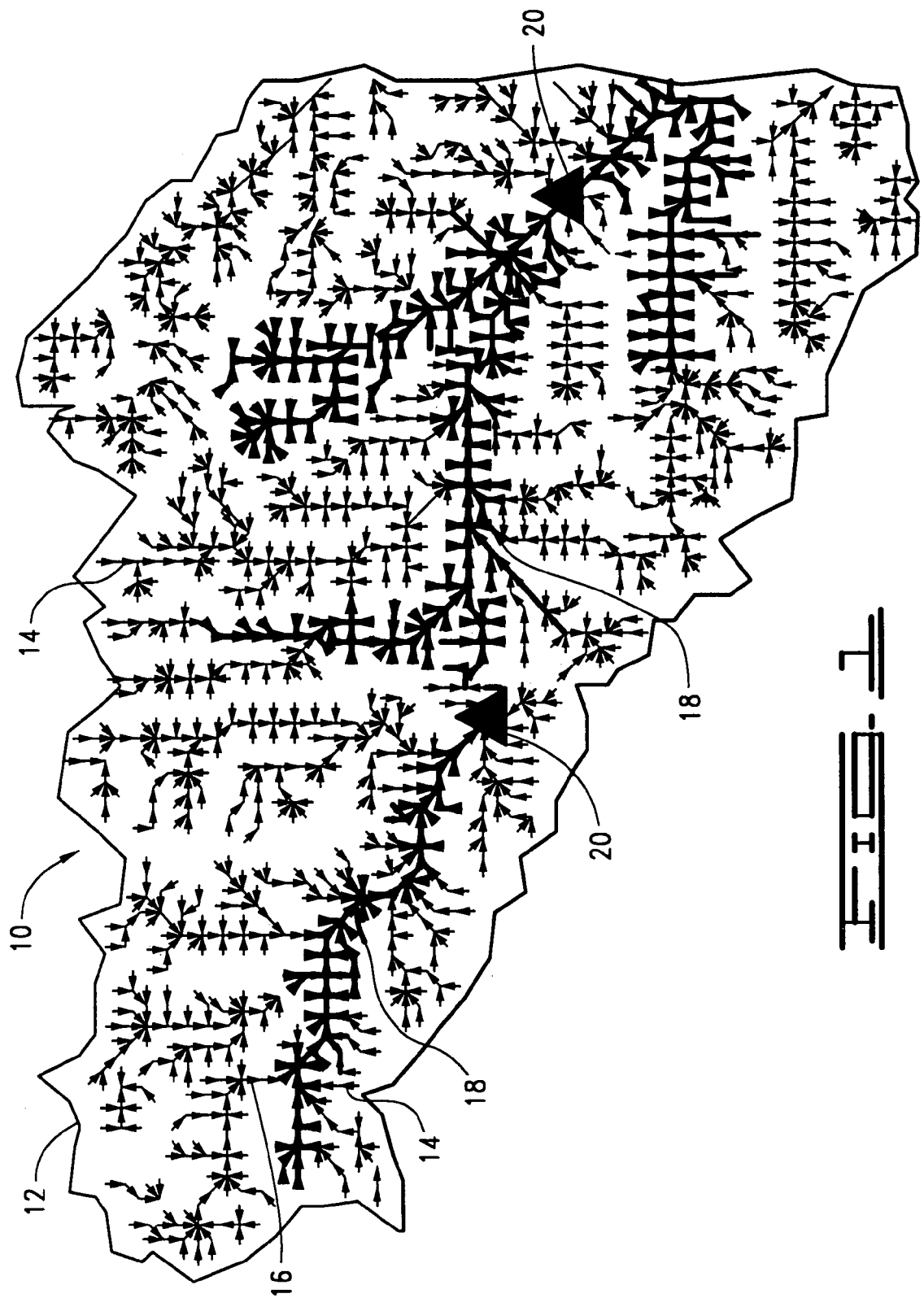
FIG. 1 is a diagrammatic view of a portion of a geographic region showing the drainage characteristics of the drainage network and the connectivity of a plurality of cells.
Figure 2:
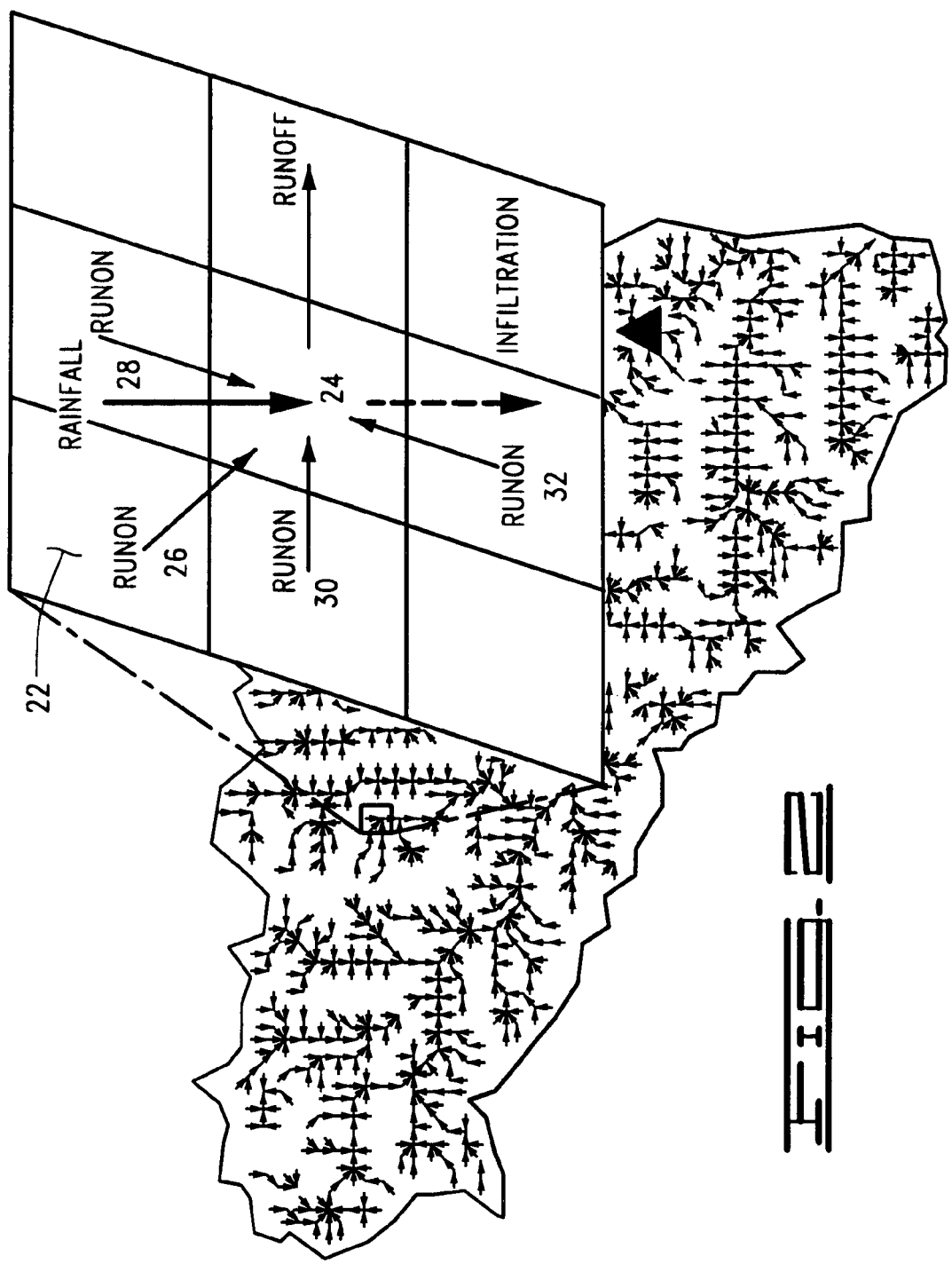
FIG. 2 is a close-up view of a three-by-three section of cells of the drainage network.

Referring now to FIG. 1, there is shown therein a diagrammatic representation of a geographic region 10 defined by a boundary 12. A plurality of arrows 14, indicating the flow direction of water, are shown within the geographic region 10. For purposes of illustration, each arrow 14 represents the flow of water within an individual cell 22 (FIG. 2). As used herein, the term "cell" is used to refer to any discrete unit of the geographic region. It will be appreciated that the cells 22 may have varying shapes and sizes without departing from the spirit of the invention.

As shown in FIG. 1, the individual cells 22 and the flow direction arrows 14 therein, form a drainage network 16 that flows generally from west to east. The drainage network 16 may be derived from flow direction data available from the publicly available HYDRO-1K data set. The HYDRO-1K data set is a geo-referenced data set that maps elevations and derivative information such as flow on the Earth's surface with a resolution of one thousand (1000) meters. The map may display flow direction in eight (8) directions to illustrate the connectivity of overland (e.g., diffuse) and channel water flow. To produce a high quality flow direction map as seen in FIG. 1, the flow direction map may be biased towards the stream network—shown using bolded arrows 18. See Moore, I. D. and Grayson, R. B. (1991), "*Terrain-based catchment partitioning and runoff prediction using vector elevation data*," Wat. Resour. Res., 27 (6), June 1991, 1177–1191. Also shown in FIG. 1 is a plurality of observation points 20 for observing flow within the drainage network 16. These observation points 20 provide data related to the realized volume of flow observed at the point at a given time. This data may be provided by rain gauges, a U.S.G.S. stream gauge, a flow meter or any other device used to measure flow at the observation point 20.

It will be appreciated that the visual representation of the geographic region 10 illustrated in FIG. 1 may be adapted to display various surface and soil characteristics of the region. For example, the land cover or land use of the region showing buildings, roads or land cover characteristics may be displayed as a backdrop to the drainage network 16. Additionally, the topography of the region may be displayed as a backdrop to the drainage network 16.

Turning now to FIG. 2, there is shown therein an enlarged view of a three-by-three section of individual cells 22 used to determine runoff from a portion of the geographic region 10. It will be appreciated that each cell within the drainage network 16 comprises a plurality of soil parameters and a plurality of surface parameters. As can be seen in FIG. 2, infiltration is one of the plurality of soil parameters that may be considered when determining runoff from the cell. Additionally, rainfall and runon are factors used to determine runoff.

FIG. 2 graphically illustrates the factors considered to determine the runoff from a selected cell 24 disposed within the geographic region 10. To determine the runoff from cell 24 the runon flowing into the selected cell 24 from the adjacent cells, upstream of the selected cell, is calculated. Runon values are derived from a determination of the hydrologic properties of inflowing adjacent cells 26, 28, 30 and 32. The hydrologic properties of the inflowing cells are calculated by calculating the volume of flow from cells upstream of the inflowing adjacent cells and such factors as precipitation rate, infiltration rate, and surface parameters, overland flow velocity, hydraulic roughness, and bed or channel slope.

Precipitation values may be obtained from in situ or remote sensors including radar, satellite, rain gauges, and in combination. Radar data may be obtained from the WSR-88D radar deployed by the National Weather Service. The WSR-88D radar provides radar reflectivity data in various modes and coverage patterns. Radar data is used to determine the amount of precipitation falling in a given cell over a period of time. Radar data is generally updated at intervals as short as five (5) to six (6) minutes and can provide precipitation rates as well as the speed of precipitation bands as they move across the geographic region 10. The precipitation data, as discussed above, is used to calculate the amount of runon into the selected cell 24 as well as the amount of runoff from the selected cell.

Continuing with FIG. 2, infiltration values (e.g., permeability of the soil) may be obtained from any soil map having the required property information. Accounting for infiltration values is appropriate because of the varying soil types that may be present within the geographic region 10. For example, soil textures may vary from sand to silt to clay. Infiltration values may be obtained from the STATSGO Dominant Soil Texture maps and are publicly available in the same or similar format as the HYDRO-1K elevation data at a resolution of one (1) kilometer.

The mathematical analogy for modeling flow and governing the equations is the kinematic wave analogy (KWA). The KWA may have applicability where the principle gradient is the land surface slope. Thus, this analogy is applicable in areas where backwater effects are of little importance. Such areas are typical of watersheds where runoff is determined by the land surface characteristics. The KWA is comprised of the simplified momentum equation and the continuity equation and the one-dimensional continuity for overland flow resulting from excess rainfall is expressed as:

$$(\partial h/\partial t)+(\partial(uh)/\partial x)=R-I \qquad \text{EQ (1)}$$

In the above relationship, R is rainfall rate, I is infiltration rate; h is flow depth, and u is overland flow velocity. In the KWA, bed slope may be equated with the friction gradient. However, when considering an open channel, this relationship amounts to the uniform flow assumption. Taking into account the relationship of bed slope and friction gradient and the relation between velocity, u, and flow depth, h, such as the Manning equation, the following is obtained:

$$u=(S_o^{1/2}/n)h^{2/3} \qquad \text{EQ (2)}$$

Where $S_o$ is the bed slope or principal land surface slope, and n is hydraulic roughness. Velocity and flow depth may depend on variables such as the land surface slope and the friction induced by hydraulic roughness. When determining channelized flow, Equation 1 is written with the cross-sectional area A:

$$(\partial A/\partial t)+(\partial Q/\partial x)=q+(R-I) \qquad \text{EQ (3)}$$

Where Q is the discharge or flow rate in the channel, and q is the rate of lateral inflow per unit length in the channel.

Overland flow is preferably modeled using equations 1 and 2 above, and channel flow is modeled using equation 3 and the appropriate form of the Manning uniform flow relation in equation 2 using a finite element method. The previously described soil, land use, topography maps and precipitation rates are used to compute and route flow through a network formulation based upon the previously mentioned finite element method computational scheme. The finite element method is described in Vieux, B. E., 2001. *Distributed Hydrologic Modeling Using GIS*, 1$^{st}$ edition, Kluwer Academic Publishers, Norwell, Mass., Water Science Technology Series, Vol. 38, the contents of which are incorporated herein by reference. The finite element method provides computation execution times that are rapid enough to allow real-time computation of flow before receiving an update of radar data.

Figure 3:
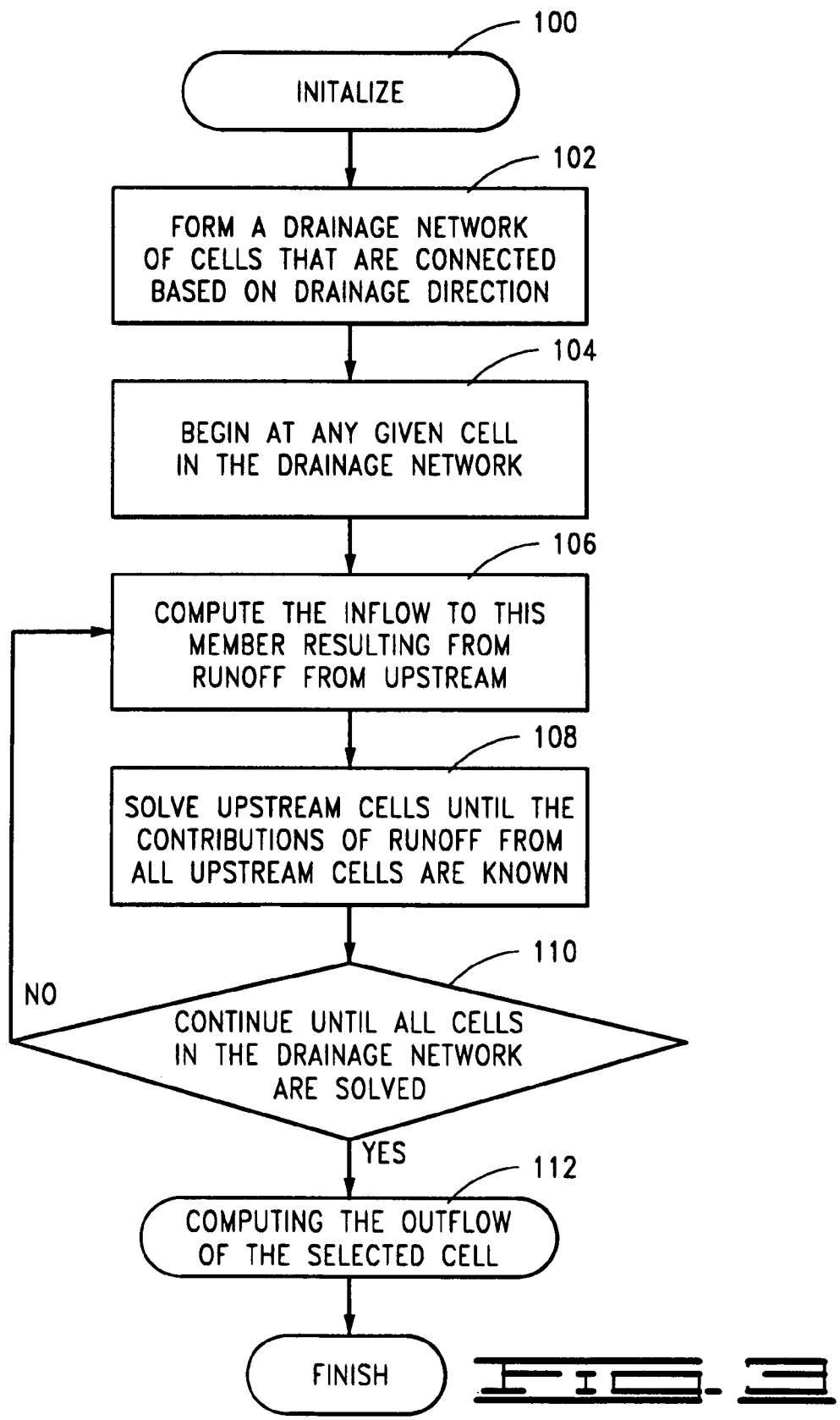
FIG. 3 is a flow chart illustrating the determination of a real-time hydrologic model by editing a soil parameter and/or a surface parameter affecting the hydrologic property of an individual cell of the geographic region.

Turning now to FIG. 3 with continuing reference to FIG. 2, the way in which the real-time hydrologic model for the geographic region 10 is produced will be discussed. At Step 100 the program is initialized on a general-purpose computer programmed to perform the modeling of the present invention. In Step 102, the network of cells 22 is generated for the geographic region and a topographical flow direction map for the cells is created. The network of individual cells 22 are connected by the flow direction arrows 14 based on the direction of drainage within each cell to form the drainage network 16. In Step 104, either the model or the user may select a cell 24 from which to begin modeling the flow within the geographic region 10.

At Step 106, the runon from the adjacent cells 26, 28, 30, and 32 into the selected cell 24 is computed, using the above-described methods and equations. The computer acquires precipitation rates for the selected cell 24 and the inflowing adjacent cells 26, 28, 30, and 32 and calculates the hydrologic properties of the inflowing adjacent cells based upon the surface and soil parameters of the inflowing adjacent cells in conjunction with precipitation rates at Step 108. The hydrologic property data from the inflowing adjacent cells provide runoff values from the adjacent cells upstream of the selected cell. It will be appreciated that the hydrologic properties of the selected cell 24 may comprise hydrologic quantities such as streamflow. Thus, Step 108 involves solving the runoff values for all of the cells upstream of the selected cell 24 until the runoff from substantially all upstream cells is at least partially known.

Next, at Step 110, if the hydrologic property for all of the cells has not been calculated, the program returns to Step 106 to compute the inflow into cell 24 from the upstream cells. Thus, Step 106 may include editing at least one of the plurality of soil parameters and/or at least one of the plurality of surface parameters of the geographic region that affects a variable hydrologic property of the cells upstream of the selected cell 24. However, if all of the runoff values for the cells within the drainage network have been at least partially determined, the program moves to the finishing Step 112 and the hydrologic property of the selected cell 24 is simulated to determine runoff at the selected cell. At the finishing Step 112, a hydrograph may be generated using the computations determined by the Steps set forth in FIG. 3. The hydrograph provides the user with predicted and actual water levels at any point within the geographic region 10.

Figure 4:
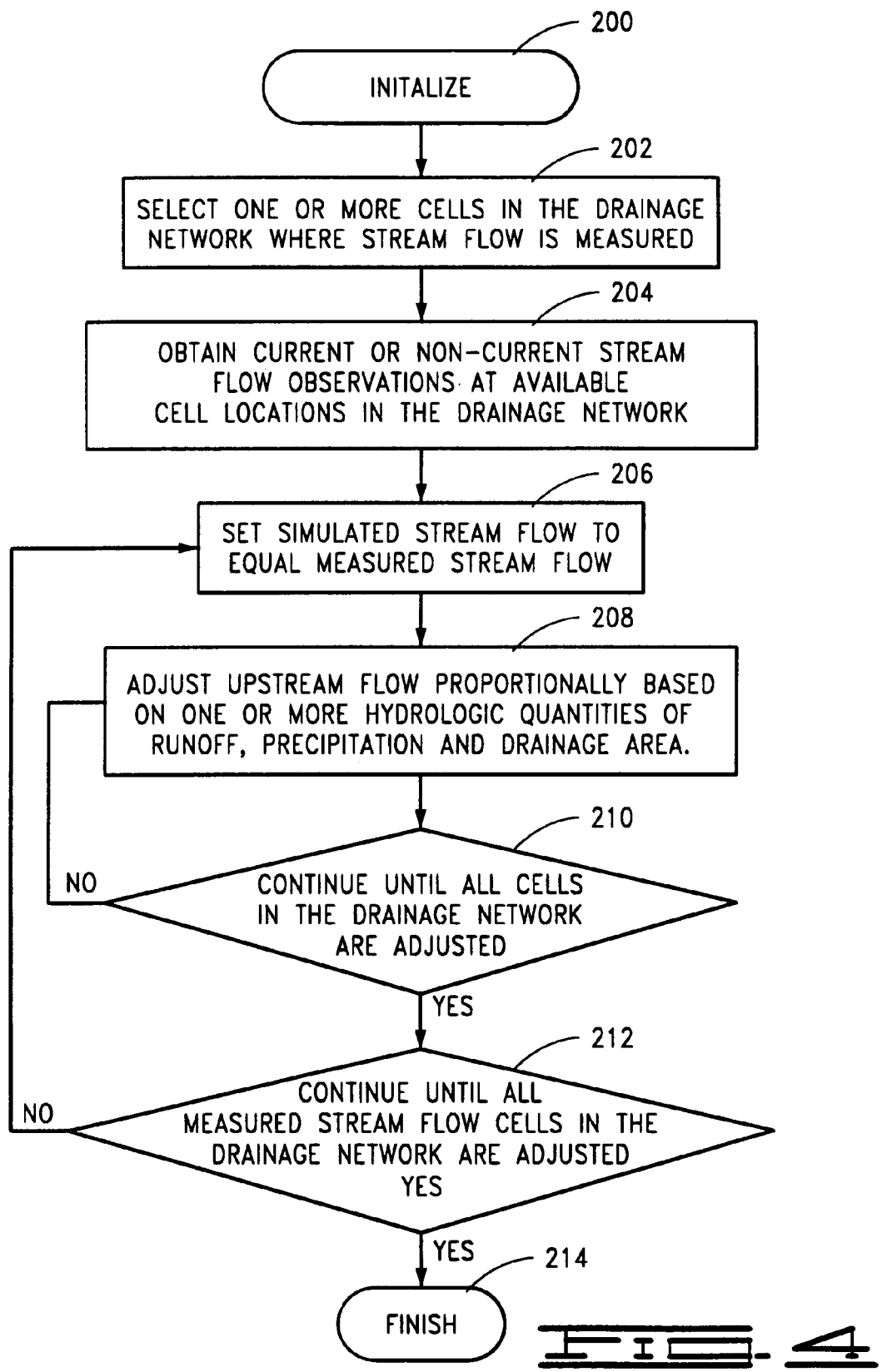
FIG. 4 is a flow chart illustrating the steps carried out to develop a substantially real-time hydrologic model by adjusting simulated stream flow to equal measured stream flow.

Turning now to FIG. 4, an alternative method for producing a real-time hydrologic property model for a geographic region is shown. The method of FIG. 4 may be used to generate a hydrograph that models the amount of flow at a selected point within the geographic region 10. As previously discussed, the geographic region 10 may comprise a plurality of cells 22. Each cell 22 may comprise a plurality of soil parameters such as infiltration. Further, each cell 22 may comprise a plurality of surface parameters comprising hydraulic roughness or slope. The geographic region 10 may comprise the inflowing adjacent cells 26, 28, 30, and 32, the runoff of which flows into the selected cell. The adjacent cells may also be characterized by various soil and surface parameters that affect the flow of water from the adjacent cells into the selected cell 24.

At Step 200 modeling of the watershed is initialized on a general-purpose desktop computer. At Step 202 one or more selected cells 24 in the drainage network 16 where stream flow is to be measured are selected. In Step 204 stream flow observation data is obtained from points 20 (FIG. 1) within the drainage network 16 and upstream of the selected cell 24 to produce a measured streamflow.

Continuing with FIG. 4, at Step 206 the simulated stream flow within the cells upstream of the observation points 20 is set to equal to the measured stream flow. At Step 208 the streamflow values of cells upstream of the points 20 are adjusted proportionally based on one or more of the hydrologic quantities of runoff, precipitation and drainage area so that the observed streamflow equals the calculated streamflow. As previously discussed, precipitation values may be obtained from radar data.

In Step 210 the adjustment routine of Step 208 is repeated until all of the cells 22 in the drainage network have been properly adjusted. Once all of the cells 22 have been adjusted, the measured stream flow cells in the drainage network are adjusted. If all of the measured stream flow cells in the drainage network have not been properly adjusted the program returns to Step 206 and simulated streamflow is set to equal measured streamflow. When all of the measured stream flow cells in the drainage network have been properly adjusted the program is completed (Step 214) and the hydrologic property of the selected cell 24 may be simulated based on inflow from the upstream cells, the plurality of soil and surface parameters, and the updated precipitation values.

Figure 5:
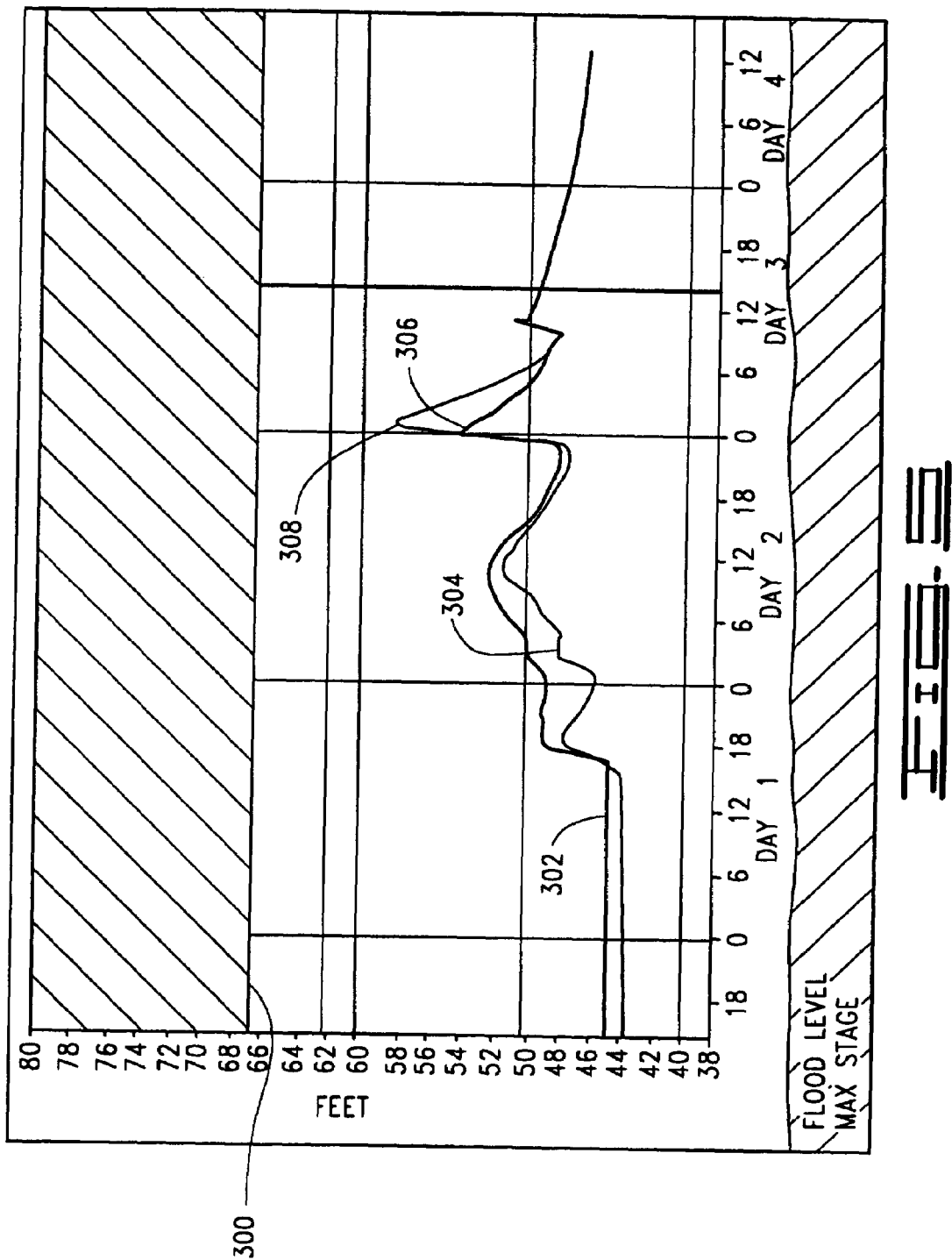
FIG. 5 is an illustration of an exemplary hydrograph produced using the method of the present invention to show predicted and observed flow at a selected discharge point within the geographic region.

Turning now to FIG. 5 there is shown a unit hydrograph resulting from the simulation of the hydrologic property of the selected cell 24 disposed with the geographic region 10 (FIG. 1). The hydrograph may be displayed on the monitor of a general-purpose computer. The unit hydrograph if FIG. 5 illustrates the level of runoff at a selected discharge point, such as cell 24 (FIG. 2), over a selected period of time. The selected cell 24 may be representative of a drain pipe passing under a roadway, the outlet of a drainage gulley or any other channel or overland discharge point located within the drainage network. The hydrograph shows predicted and actual water levels over approximately three (3) days of precipitation. A line 300 on the hydrograph delineates the predetermined flood level. For purposes of illustration, flood level at the discharge point is known or has been preselected at sixty-seven (67) feet.

Two lines 302 and 304 are plotted on the hydrograph during the precipitation event. Line 302 illustrates the predicted water levels at the discharge point for the precipitation event. As shown in FIG. 5, the previously described modeling methods predicted that water levels would rise to a level of 52.86 feet during the precipitation event. The predicted water level line 302 is generated for the discharge point based upon the hydrologic properties of cells located within the observed geographic region and upstream of the cell containing the discharge point. Line 304 plots the observed water level at the discharge point during the precipitation event. As can be seen in FIG. 5 some acceptable variation between the predicted and observed water levels may exist.

The plot of predicted water level 302 has a peak 306 between the zero and sixth hour of day three. The observed water level peak 308 also occurred between the zero and sixth hour of day three. The predicted peak 306 was generated in advance of the observed peak 308 using the methods described herein. In the event the predicted peak 306 extends to or above the flood level line 300, the user is provided with advance warning of a flood event. Thus, the hydrograph of FIG. 5 is useful as a tool for providing advance warning of flooding at a selected discharge point.

Turning now to FIG. 6, there is shown therein a system 400 for gathering, processing, and transmitting the hydrologic modeling data to an end-user via the Internet 402. The system 400 comprises a server 404 adapted to receive and process precipitation data received from radar or rain gauges 406. The server 404 is capable of transmitting processed data to a plurality of end-user computers 408, via the Internet 402.

In this application, the computer 408 is programmed with a browser control program 410, which includes a hypertext viewer 412 capable of rendering an HTML document on the computer's display screen. The computer 408 is connected to the Internet 402 via a communications connection 414, such as a telephone line, an ISDN, T1 or like high speed phone line, a co-axial cable, a satellite link, an optical fiber link, an Ethernet or other local area network technology wire.

Map images 416, flow data 418, and radar data 420 are acquired by and stored at the website server 404. The user's computer 408 connects to the website server 404 and queries the server for the latest streamflow data related to a watch point selected by the user. The server 404 then accesses the stored map images 416, flow data 418 and radar data 420 to create a topographical flow map of the geographic region 10 within which the selected watch point resides. Current rain gauge and radar precipitation data 406 is acquired by the server 404 and the hydrologic property of the cell is simulated by the server to produce a real-time hydrologic model of the streamflow rate at the selected watch point.

It will be appreciated by one of skill in the art that the server 404 and computer 408 may be adapted to work in conjunction to allow the user to save pre-selected watch points in a basin properties file in the computer's memory. Storing pre-selected watch points on the computer's memory allows the user to access important flow data with greater speed and efficiency.

Once the modeling is complete, the hydrograph (FIG. 5) is transmitted via the Internet 402 to the computer 408 for display. In an alternative embodiment, the hydrograph may have a series of colored icons that indicate impending flood stages. For example, a red icon may appear when flow predicted at a watch point meets or exceeds the predetermined flood level. It will be appreciated, however, that the user may request, and the server 404 may transmit other useful images and text to the computer such as basin wide views of rainfall, runoff, and inundation.

Various modifications can be made in the design and operation of the present invention without departing from the spirit thereof. Thus, while the principal preferred construction and modes of operation of the invention have been explained in what is now considered to represent its best embodiments, which have been illustrated and described, it should be understood that within the scope of the appended claims, the invention may be practiced otherwise than as specifically illustrated and described.

What is claimed is:

1. A method for producing a substantially real-time hydrologic model for a geographical region comprising a non-current hydrological property value, the geographical region comprising at least a cell and at least one inflowing adjacent cell, the cell and inflowing adjacent cell each comprising a plurality of soil parameters and a plurality of surface parameters, the method comprising:

creating a topographical flow direction map for the geographical region;

displaying the plurality of soil parameters and the plurality of surface parameters for the cell on the topographical flow direction map;

editing at least one of the plurality of soil parameters and/or at least one of the plurality of surface parameters affecting the hydrologic property of the cell and inflowing adjacent cells based on an observed precipitation value;

simulating the hydrologic property of the cell to produce the real-time hydrological model of the geographical region;

updating the hydrologic property of the cell with an observed hydrological property value;

adjusting the hydrological model in response to the observed hydrological property value; and apportioning the observed hydrologic property value to the inflowing adjacent cells.

2. The method of claim 1 wherein the hydrologic property comprises hydrological quantities.

3. The method of claim 2 wherein the hydrologic quantities comprise at least streamflow.

4. The method of claim 1 wherein the plurality of soil parameters comprise infiltration.

5. The method of claim 1 wherein the plurality of surface parameters comprise slope and hydraulic roughness.

6. The method of claim 5 wherein the slope comprises channel slope.

7. The method of claim 1 further comprising superimposing the topographical flow direction map over a graphical display of the geographical region.

8. The method of claim 7 wherein the graphical display of the geographical region comprises a land use map.

9. The method of claim 1 further comprising obtaining precipitation values.

10. The method of claim 1 further comprising displaying the hydrologic property of the cell on a display.

11. The method of claim 10 wherein the geographic region comprises a plurality of cells, the method further comprising displaying the hydrologic property of each cell on the display.

12. A method for producing a real-time hydrologic property model for a geographical region, the geographic region being characterized by at least a cell, the cell comprising a plurality of soil parameters, a plurality of surface parameters, and having at least an inflowing adjacent cell, the inflowing adjacent cell comprising a plurality of soil parameters and a plurality of surface parameters, the method comprising:

obtaining a precipitation value for the cell and a precipitation value for the inflowing adjacent cell;

determining a simulated hydrologic property for the inflowing adjacent cell based on the plurality of soil parameters for the inflowing adjacent cell, the plurality of surface parameters for the inflowing adjacent cell and the precipitation value for the inflowing adjacent cell;

determining a simulated hydrologic property value for the cell based on the simulated hydrologic property value for the inflowing adjacent cell;

obtaining an observed hydrologic property value for the cell;

replacing the simulated hydrologic property value with the observed hydrologic property value for the cell apportioning the observed hydrologic property value for the cell to the inflowing cell and any cells upstream of the inflowing adjacent cells;

updating the hydrologic property for the cell and the hydrologic property for the inflowing adjacent cells and the cells upstream of the inflowing adjacent cells with an updated precipitation value for the cell and an updated precipitation value for the inflowing adjacent cells; and simulating the hydrologic property of the cell based on the plurality of soil parameters, the plurality of surface parameters, and the updated precipitation value.

13. The method of claim 12 wherein the non-current hydrologic property value and the current hydrologic property value comprise hydrological properties.

14. The method of claim 13 wherein the hydrological quantities comprise streamflow.

15. The method of claim 12 wherein the plurality of soil parameters comprise infiltration.

16. The method of claim 12 wherein the plurality of surface parameters comprise slope.

17. The method of claim 16 wherein the slope comprises channel slope.

18. The method of claim 12 further comprising superimposing the topographical flow direction map over a graphical display for the geographical region.

19. The method of claim 18 wherein the graphical display of the geographical region comprises a land use map.

20. The method of claim 12 further comprising displaying the hydrologic model on a computer.

21. The method of claim 12 wherein the simulation of the hydrologic property of the cell and the inflowing adjacent cells includes displaying a graphical representation of the plurality of soil parameters, the plurality of surface parameters and the updated precipitation value.

22. A method for determining runoff of a geographical region for flooding or water resources management, the geographic region having a plurality of soil parameters and a plurality of surface parameters, at least a cell having a variable hydrologic property, the method comprising:

creating a topographical flow direction map of the geographic region, the flow direction map comprising a cell variable;

assigning an overland slope to the geographic region;

obtaining a precipitation rate for the geographic region;

editing at least one of the plurality of soil parameters and/or at least one of the plurality of surface parameters of the geographic region that affects the variable hydrologic property of the cell;

simulating the hydrologic property of the cell based on the overland slope, the plurality of soil parameters, the plurality of surface parameters, and the precipitation value to determine the runoff of the geographical region;

updating the hydrologic property of the cell based on an observed hydrological property value for the cell;

adjusting the runoff of the geographical region in response to the observed hydrological property value; and apportioning the observed hydrologic property upstream to inflowing adjacent cells.

23. The method of claim 22 wherein the hydrologic quantity comprises hydrologic quantities.

24. The method of claim 23 wherein the hydrologic quantity comprises streamflow.

25. The method of claim 22 wherein the plurality of soil parameters comprise infiltration.

26. The method of claim 22 wherein the plurality of surface parameters comprise slope.

27. The method of claim 26 wherein the slope comprises channel slope.

28. The method of claim 22 further comprising superimposing the topographical flow direction map over a graphical display for the geographical region.

29. The method of claim 28 wherein the graphical display of the geographical region comprises a land use map.

30. The method of claim 22 further comprising displaying the hydrologic model on a computer.

31. The method of claim 22 wherein the collective soil and surface parameters are differentiated by seasonal conditions.

* * * * *